(12) United States Patent
Kashihara et al.

(10) Patent No.: US 7,474,520 B2
(45) Date of Patent: Jan. 6, 2009

(54) STORAGE DEVICE

(75) Inventors: Masami Kashihara, Tokyo (JP); Katsuji Ikeda, Tokyo (JP); Yoshihiro Hozumi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/935,569

(22) Filed: Nov. 6, 2007

(65) Prior Publication Data
US 2008/0089009 A1 Apr. 17, 2008

Related U.S. Application Data

(63) Continuation of application No. PCT/JP2006/009251, filed on May 8, 2006.

(30) Foreign Application Priority Data
May 6, 2005 (JP) ............... 2005-135344

(51) Int. Cl.
*H01G 9/00* (2006.01)
(52) U.S. Cl. .................. 361/502; 361/504; 361/508; 361/512; 361/519; 361/523
(58) Field of Classification Search .......... 361/502, 361/503–504, 516–519, 523, 525, 528, 530, 361/531, 302–305
See application file for complete search history.

(56) References Cited
U.S. PATENT DOCUMENTS

| 6,222,720 | B1 | 4/2001 | Aoki et al. | |
| 6,433,997 | B1 * | 8/2002 | Noguchi et al. | 361/511 |
| 6,660,428 | B2 * | 12/2003 | Hall | 429/120 |
| 6,870,725 | B2 * | 3/2005 | Sakata et al. | 361/302 |
| 6,896,993 | B2 | 5/2005 | Hozumi et al. | |
| 7,123,468 | B2 * | 10/2006 | Kawashima et al. | 361/532 |
| 7,218,505 | B2 * | 5/2007 | Naito et al. | 361/523 |
| 7,286,335 | B2 | 10/2007 | Hozumi et al. | |
| 7,307,830 | B2 * | 12/2007 | Gallay et al. | 361/502 |
| 2002/0076604 | A1 | 6/2002 | Matsuoka et al. | |
| 2006/0245144 | A1 | 11/2006 | Hozumi et al. | |

FOREIGN PATENT DOCUMENTS

| JP | 2001-015169 A | 1/2001 |
| JP | 2002-83579 A | 3/2002 |
| JP | 2002-246003 A | 8/2002 |
| JP | 2003-217560 A | 7/2003 |

* cited by examiner

*Primary Examiner*—Nguyen T Ha
(74) *Attorney, Agent, or Firm*—Oblon, Spivak, McClelland, Maier & Neustadt, P.C.

(57) ABSTRACT

A storage device, which has a simple structure and a low connection resistance and is robust, and which is ease to mount is provided. In the storage device, an L-shaped aluminum busbar 157 protrudes from the center of the top of a sealing plate 41 to the right. The busbar 157 has a barrel portion 157*a* and a projecting part 157*b* horizontally protruding from the top end of the barrel portion 157*a*. A terminal hole 159 is made in an end of the projecting part 157*b*, so that the positive electrode of another unitary cell to be connected in series can be connected. The barrel portion 157*a* of the busbar 157 is welded to the sealing plate 41, and the length of the projecting part 257*b* is minimized. Accordingly, the device is robust and has a low resistance, and consequently can deal with a large current.

5 Claims, 6 Drawing Sheets

STORAGE DEVICE

TECHNICAL FIELD

The present invention relates to a storage device, and more specifically, to a storage device which has a simple structure and a low connection resistance and is robust, and which is easy to mount.

BACKGROUND ART

Electric double layer capacitors, electrolytic capacitors, batteries, and the like collect power from an internal element and have a power collection structure for electrically connecting the element to external connection terminals. In connection with storage devices as batteries having a conventional power collection structure. Patent Document 1 identified below has been known.

According to Patent Document 1, a plurality of storage devices are disposed in parallel, each storage device having a positive terminal and a negative terminal on the top thereof. These storage devices are connected in series by connecting the positive terminals and negative terminals alternately with busbars. Each busbar is flat-shaped, is provided independent of the storage devices, and has a hole, where the negative terminal of a storage device fits in, on one end thereof and another hole, where the positive terminal of an adjacent storage device fits in, at the other end thereof. To connect two storage devices with one busbar, the negative terminal of one of the devices is put into the hole at one end, and the positive terminal of the other device is put into the hole at the other end. Then, the busbar is secured by screwing bolts to the positive terminal and the negative terminal from above.

Patent Document 1: JP-A-2002-83579

DISCLOSURE OF THE INVENTION

Problems to be Solved by the Invention

Conventionally, since the busbars are independent of the storage devices, even if the positive and negative terminals and the busbars are connected in series, their connections are structurally weak and have a high connection resistance.

If a force is exerted on a busbar after the devices are connected, the connection resistance could increase because of loosened connection. This could cause a problem when a large current is passed through the positive terminals and the negative terminals.

In view of the problems described above, it is an object of the present invention to provide a storage device which has a simple structure, and a low connection resistance and is robust, and which is easy to mount.

Means to Solve the Problems

A storage device according to a first aspect of the present invention includes long sheet of collector foil; a first electrode and a second electrode, each comprising a long electrode layer formed on at least one surface of a long sheet of collector foil, leaving a strip part along a long side of the long sheet of collector foil; long separators placed between the first electrode and the second electrode; a first external terminal and a second external terminal electrically connected to the first electrode and the second electrode, respectively, for collecting a current; an electrolyte; a metal case for accommodating the first electrode, the second electrode, the separators, and the electrolyte and for functioning as the second external terminal; and a sealing plate including the first external terminal, for sealing the metal case. The first electrode and the second electrode are wound, with the separators placed therebetween, to form a pillar-shaped element; the strip part of the first electrode and the strip part of the second electrode are disposed to protrude from opposite sides of the separators; the first external terminal is held on the sealing plate; the sealing plate or the metal case has a plate-shaped busbar welded thereto, a part of the busbar having a projecting part protruding from the sealing plate; and the projecting part has a terminal hole formed therein so as to have substantially the same shape as a bottom surface of the first external terminal.

The storage device may comprise an electric double layer capacitor, an electrolytic capacitor, a battery, or the like.

The busbar is welded to the sealing plate or the metal case, and the length of the projecting part is minimized. Accordingly, the device has a simple structure, is robust, and has a small connection resistance, and can deal with a large current. The external terminals can be connected easily, and the connected terminals can ensure stability.

The storage device according to a second aspect of the present invention configured such that the first external terminal is disposed such that 80% or greater of an area of the bottom surface of the first external terminal is located within a half of a bottom surface of the pillar-shaped element.

Most of the mounting position of the first external terminal fits in a half of the bottom surface of the pillar-shaped element. Because the position of the first external terminal is displaced from the central position of the bottom surface of the pillar-shaped element, laser welding can be performed over almost the entirety of the remaining half area, even if the diameter of the first external terminal is increased. Accordingly, the strip part of the first electrode can be electrically connected to the first collector plate in a substantially uniform manner. In a development view showing the long sheets of collector foil in an unwound form, weld points are found within a prescribed length at the beginning of the winding, which was not found in the conventional structure.

Therefore, the storage device can have the first external terminal formed so as to have a greater diameter, and even when it is combined with a busbar, the current efficiency can be improved and the internal resistance can be decreased.

The storage device according to a third aspect of the present invention is configured such that the area of the bottom surface of the first external terminal is 3% to 50% of an area of the bottom surface of the pillar-shaped element.

The area of the bottom surface of the first external terminal may be 3% to 50% of the area of the bottom surface of the pillar-shaped element. A more preferred range is 5% to 20%, and the most preferred range is 8% to 12%.

The storage device according to a fourth aspect of the present invention is configured such that it further includes a first collector plate disposed between the first electrode and the sealing plate, and integrated with or connected directly to the first external terminal, for electrically connecting the first electrode and the first external terminal, and the strip part of the first electrode is laser-welded to the first collector plate.

In this case, the first collector plate makes it easy to perform laser welding and allows the strip part of the first electrode to be electrically connected to the first collector plate in a substantially uniform manner.

The storage device according to a fifth aspect of the present invention is configured such that the strip part of the second electrode is laser-welded to a second collector plate; the second collector plate has a current collecting section integrally formed therein or connected directly thereto; and the current collecting section is electrically connected to the metal case.

In this case, a simple structure can be provided by connecting the strip part of the second electrode to the metal case through the second collector plate and the current collecting section. It is preferred in terms of reduction in the number of parts and improved ease of handling that the second collector plate and the current collecting section be formed in one piece.

According to the present invention, the plate-shaped busbar is welded to the sealing plate or the metal case and has the projecting part protruding from the sealing plate, and the terminal hole, which has substantially the same shape as the bottom surface of the first external terminal, is formed in the projecting part, as described above. The busbar is robust, having a simple structure and a reduced connection resistance, and consequently can cope with a large current. The external terminals can be connected easily, and the connected terminals can ensure stability.

EXPLANATION OF REFERENCE NUMERALS

Figure 1:
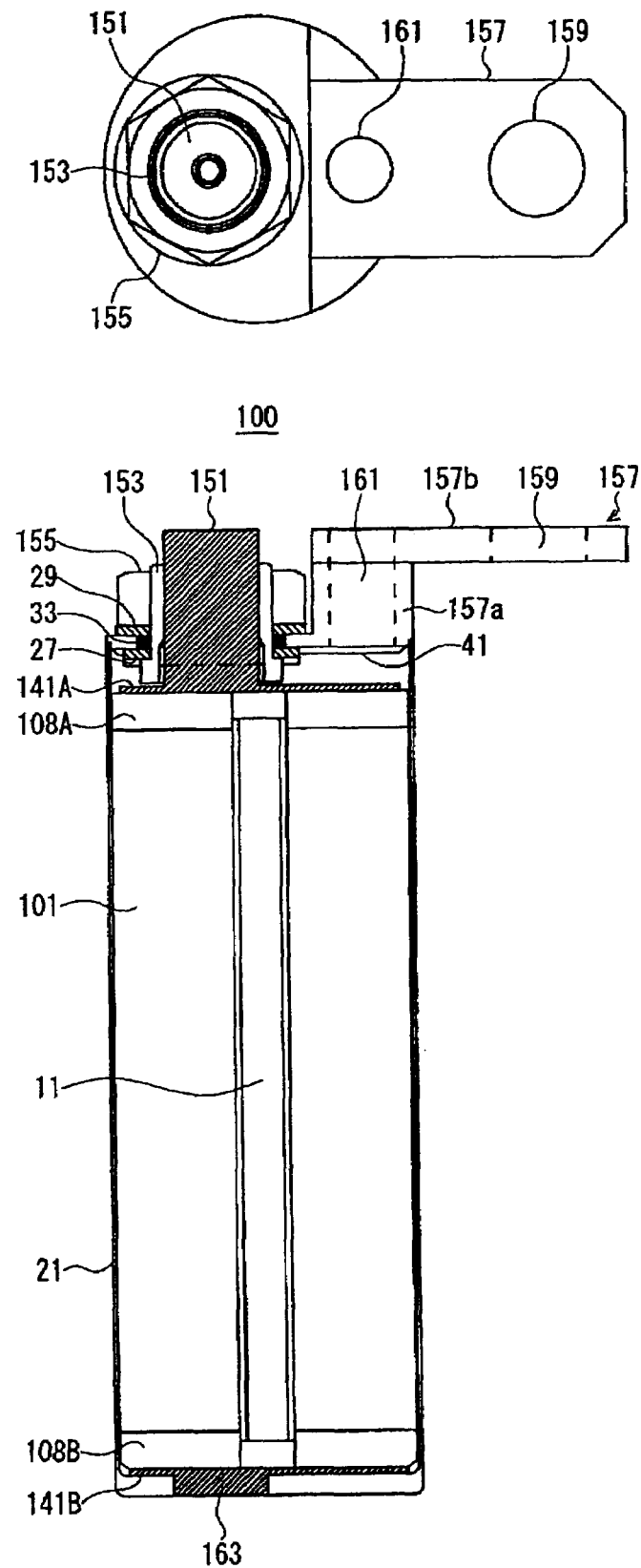
FIG. 1 contains a plan view and a longitudinal sectional view of an electric double layer capacitor according to an embodiment of the present invention.

5: separator
9A and 9B: electrode layer
21: outer case
41: sealing plate
100: unitary cell
101: element
103A and 103B: electrode
107A and 107B: collector foil
108A and 108B: edge strip part
141A and 141B: collector plate
143A and 143B: plate
147A, 147B, 173 and 175: linear weld
151 and 171: positive terminal
153: center terminal
155: nut
157 and 257: busbar
157a and 257a: barrel portion
157b and 257b: projecting part
159: terminal hole
161: hole for mounting a one-way valve
163: negative terminal
205: one-way valve fitting portion

BEST MODE FOR CARRYING OUT THE INVENTION

Embodiments of the present invention will be described below. In the subsequent description, a first electrode is the positive electrode, and a second electrode is the negative electrode. However, a reversed combination of the positive electrode and the negative electrode may also be used.

Figure 2:
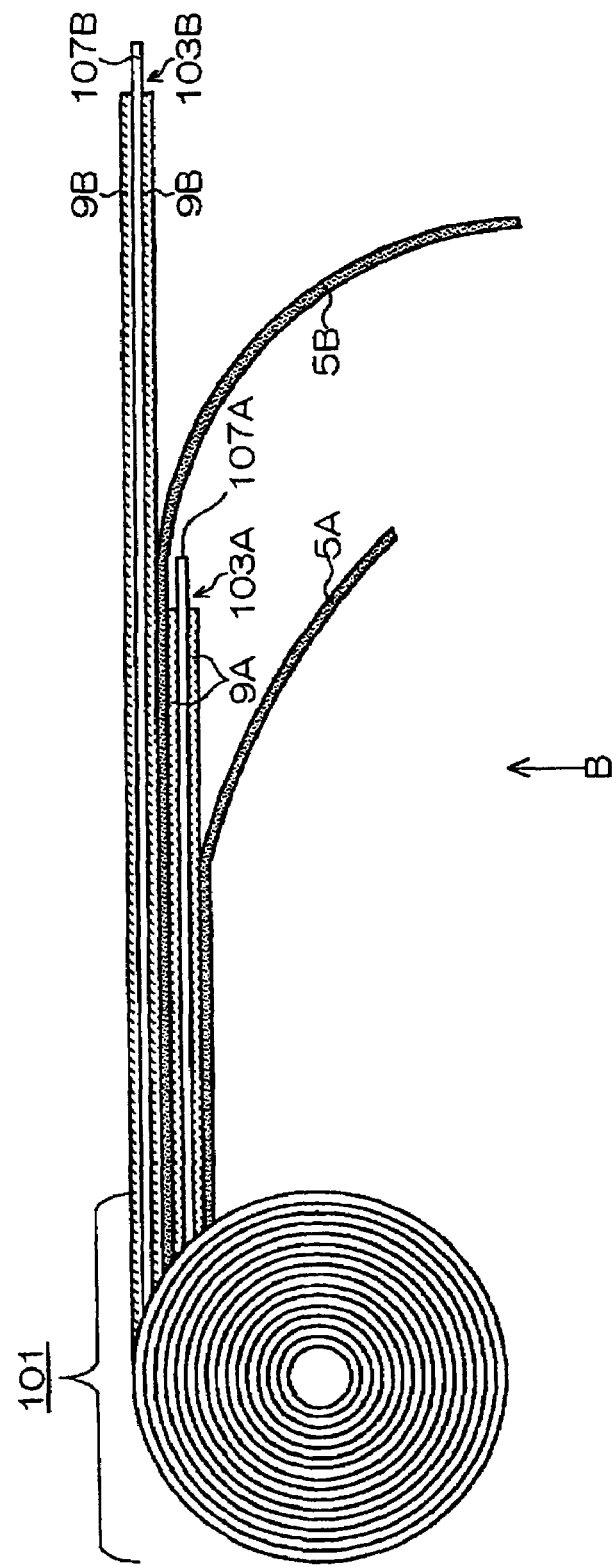
FIG. 2 is a structural view of an element of the electric double layer capacitor.

FIG. 1 contains a plan view and a longitudinal sectional view of an electric double layer capacitor having a power collection structure, according to an embodiment of the present invention. FIG. 2 is a structural view of an element of the electric double layer capacitor, and FIG. 3 is a view (without separators) taken in the direction of arrow B in FIG. 2.

Figure 3:
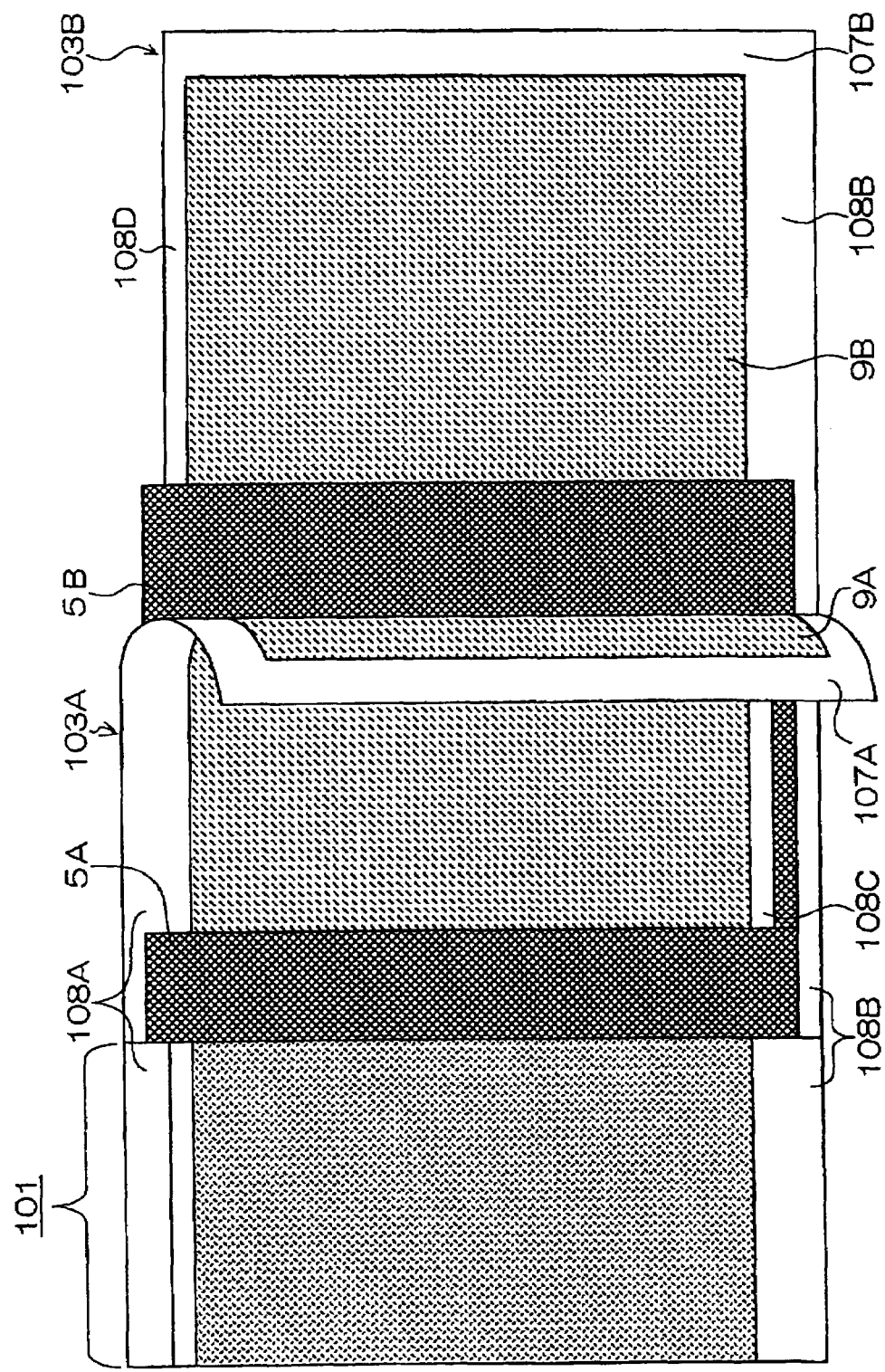
FIG. 3 is a view (without separators) taken in the direction of arrow B in FIG. 2.

In FIGS. 1 to 3, like a conventional unitary cell 50, a unitary cell 100 of the electric double layer capacitor of the present invention has a pillar-shaped element 101 impregnated with an electrolyte, which is not shown, sealed by an outer case 21 and a sealing plate 41. Both the outer case 21 and the sealing plate 41 are formed from aluminum.

Electrodes 103A and 103B forming the positive and negative electrodes of the element 101 of the present invention respectively include long sheets of collector foil 107A and 107B and electrode layers 9A and 9B formed on both surfaces of the collector foil 107A and 107B, leaving edge strip parts 108A and 108B along the full length of opposite longitudinal sides.

Like conventional electrodes 3A and 3B, the electrode layers 9A and 9B are made from a material having a high-specific surface area, so that electric double layers are formed on the collector foil 107A and 107B to achieve storage functions. The electrode layers 9A and 9B may be formed on both surfaces of the collector foil 107A and 107B, respectively. FIG. 3 shows that the electrodes 103A and 103B have small strip parts 108C and 108D on the opposite sides from the edge strip parts 108A and 108B. These strip parts 108C and 108D serve as margins required between the collector foil 107A and 107B and the electrode layers 9A and 9B when the electrodes 103A and 103B are fabricated. It is preferred in terms of the energy density of the element 101 that these parts be not formed.

The electrodes 103A and 103B are wound to form the pillar-shaped element 101 in such a manner that their edge strip parts 108A and 108B protrude from the opposing sides of separators 5A and 5B along the longitudinal direction of the separators 5A and 5B. In the outermost region of the element 101, an insulating member, which is not shown, is disposed to cover the electrodes 103A or 103B. A preferred insulating member is a separator 5. When the separator 5 is longer than the electrodes 103A and 103B and is wound together, the element 101 with its outermost region covered with the separator 5 can be easily provided, which is preferred.

From both spiral end faces of the element 101 formed as described above, the edge strip parts 108A and 108B of the electrodes 103A and 103B are exposed separately. The edge strip parts 108A and 108B are connected to collector plates 141A and 141B.

The collector plate 141A has a cylindrical positive terminal 151 welded to an upper side thereof. The positive terminal 151 differs from that on the conventional unitary cell 50 in that the entire positive terminal 151 is disposed in a left-half area of the collector plate 141A as shown. In FIG. 1, the right edge of the positive terminal 151 is just on the center of the collector plate 141A. The positive terminal 151 is surrounded by a center terminal 153, which is further surrounded by a nut 155 which clamps an insulating washer 29.

The collector plate 141B has a cylindrical negative terminal 163 welded to a lower side thereof. Like the positive terminal 151, the negative terminal 151 is disposed in a left-half area of the collector plate 141B as shown. In FIG. 1, the right edge of the negative terminal 163 is just on the center of the collector plate 141B. The negative terminal 163 is connected to the outer case 21.

The sealing plate 41 has an L-shaped aluminum busbar 157 disposed thereon so as to extend toward an upper right area of the figure with respect to the center thereof. The busbar 157 has a barrel portion 157a and a projecting part 157b extending horizontally from the top end of the barrel portion 157a. The projecting part 157b has a terminal hole 159 made in an end thereof, so that the positive electrode of another unitary cell to be connected in series can be connected thereto. The barrel portion 157a has a one-way valve mounting hole 161 formed therein, and the hole penetrates the sealing plate 41.

The one-way valve mounting hole 161 is formed to mount a one-way valve therein. The one-way valve mounting hole 161 allows a liquid to be poured in therethrough, and the one-way valve functions as a safety valve for discharging a gas if the internal pressure becomes high.

The barrel portion 157a of the busbar 157 is welded to the sealing plate 41, and the length of the projecting part 157b is minimized. Accordingly, the busbar is robuster and has a lower resistance than the conventional busbar, which is separately provided. Therefore, a large current can be carried. The device can be mounted easily because no connection work is required for the negative electrode.

Figure 4:
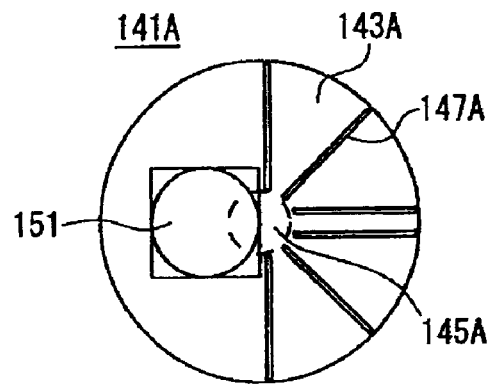
FIG. 4 contains structural views of a collector plate (positive electrode).
Figure 4:
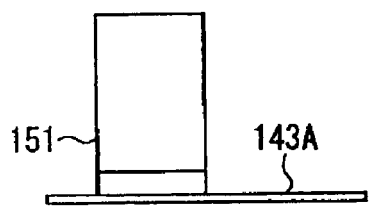
Figure 5:
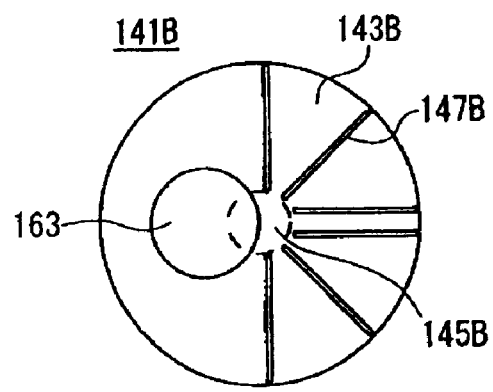
FIG. 5 contains structural views of a collector plate (negative electrode).
Figure 5:
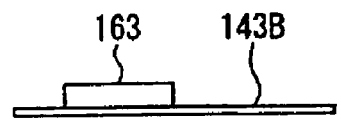

FIGS. 4 and 5 are structural views of the collector plates 141A and 141B.

In FIGS. 4 and 5, the collector plates 141A and 141B have point-symmetrical shapes, include disc-shaped plates 143A and 143B which have almost the same area as the winding cross section of the element 101, and are disposed in parallel with the winding cross section. The edge strip part 108A of the electrode 103A is connected to one surface of the plate 143A while the edge strip part 108B of the electrode 103B is connected to one surface of the plate 143B. Although the edge strip parts 108A and 108B may be connected to the plates 143A and 143B by mechanical pressure or conductive adhesion using a conductive adhesive, connections made by welding are more preferable because of a higher reliability, in both mechanical and electrical terms. Ultrasonic welding, laser welding using a YAG laser, and electron beam welding are suitable as the welding method.

It is desired that the plates 143A and 143B be welded radially from center to edge so that the distances from central portions 145A and 145B to the outermost edges become equal in every part. The radial welding is performed in the right-half areas of the plates 143A and 143B to keep out of the positive terminal 151 and the negative terminal 163, as shown in the figures. FIG. 4 contains a plan view and a side view of an integrated form of the positive terminal 151 and the collector plate 141A. FIG. 5 contains a plan view and a side view of an integrated form of the negative terminal 163 and the collector plate 141B.

As shown in FIGS. 4 and 5, linear welding is conducted radially from the central portions of the plates 143A and 143B between the collector plate 141A and the edge strip part 108A and between the collector plate 141B and the edge strip part 108B (linear welds are denoted as 147A and 147B in FIGS. 4 and 5). It is preferred that linear welding be conducted at symmetrical angles about the center (central portions 145A and 145B), because contact resistance can be reduced effectively thereby.

Even if the radial welds are provided only in the right-half areas of the plates 143A and 143B in the figures, almost equally spaced weld points are found in a development view showing the long electrodes 103A and 103B in an unwound form, from the beginning to the end of the winding. This provides weld points within a prescribed length at the beginning of winding, which is not found on the conventional winding, so that the resistance is reduced accordingly, increasing the current efficiency.

Even if the diameters of the electrode terminals increase, weld points can be provided at almost equal intervals from the beginning to the end of the winding of the long electrodes 103A and 103B in a development view. Therefore, the resistance becomes lower than before, and the current efficiency can be improved. In comparison between the size of the diameter of the electrode terminal according to the present invention and that of a conventional electrode terminal, if the unitary cell 100 of the present invention in the outer case 21 has an outside diameter of 45 mm, and if the conventional unitary cell 50 has the same size, the positive terminal 151 of the unitary cell 100 of the present invention can have a diameter of 14 mm, which is greater than the 8-mm-diameter positive terminal 23 of the conventional unitary cell 50.

Figure 6:
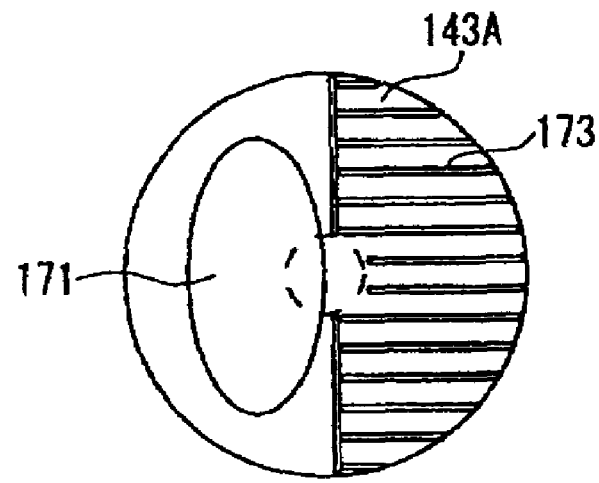
FIG. 6 is a view showing a welding manner.
Figure 7:
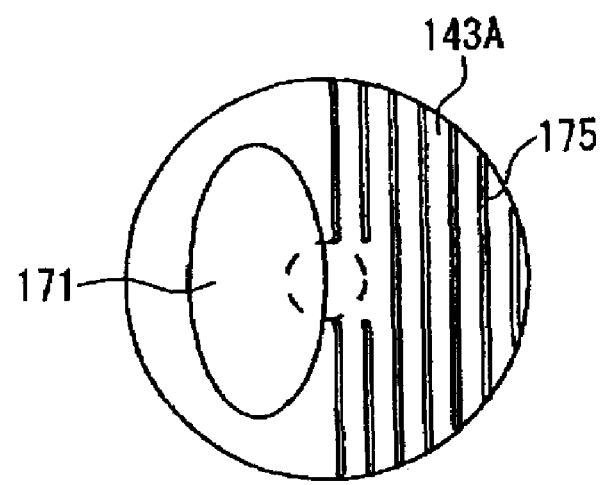
FIG. 7 is a view showing another welding manner.

Welding does not need to be performed radially. For instance, a positive terminal 171 may be disposed in the left-half area of the plate 143A or 143B, as shown in FIG. 6, and horizontal weld lines 173 shown in the figure or vertical weld lines 175 shown in FIG. 7 may be provided. In a development view of the long electrodes 103A and 103B in an unwound form, weld points are found at almost equal intervals from the beginning to the end of the winding, which means that the effects are the same as the effects provided by radial welding. The shapes of the electrode terminals does not need to be circular; they may be rectangular, oval, or the like within the left-half areas.

In connection with FIGS. 4 to 7, explanation has been made about a case where the entire positive terminal 151 and the entire negative terminal 163 are positioned in the left-half areas with respect to the centers of the collector plates 141A and 141B, and where welding is performed only in the right-half areas of the plates 143A and 143B. Different configurations are also possible. If the positive terminal 151 and the negative terminal 163 are displaced to be slightly away from the centers of the collector plates 141A and 141B and if welding is also performed at the displaced positions, then the resistance can be lowered, and the current efficiency can be improved.

Each of the positive terminal 151 and the negative terminal 163 may be displaced in such a manner that 80% of the area of the bottom surface thereof is in the left-half area of each of the plates 143A and 143B shown in FIGS. 4 and 5. This is because, in a development view of the long electrodes 103A and 103B in an unwound form, weld points are not always found at almost equal intervals from the beginning to the end of the winding, but areas without weld points between the beginning and the end of the winding are far smaller than before.

Another busbar structure will be described next.

Figure 8:
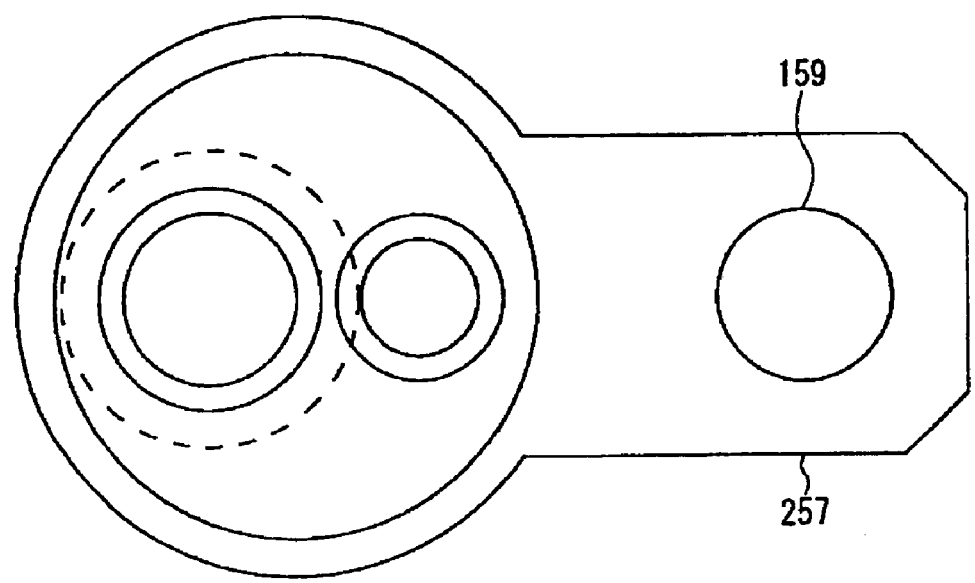
FIG. 8 contains a plan view and a longitudinal sectional view of another sealing plate and another busbar structure.
Figure 8:
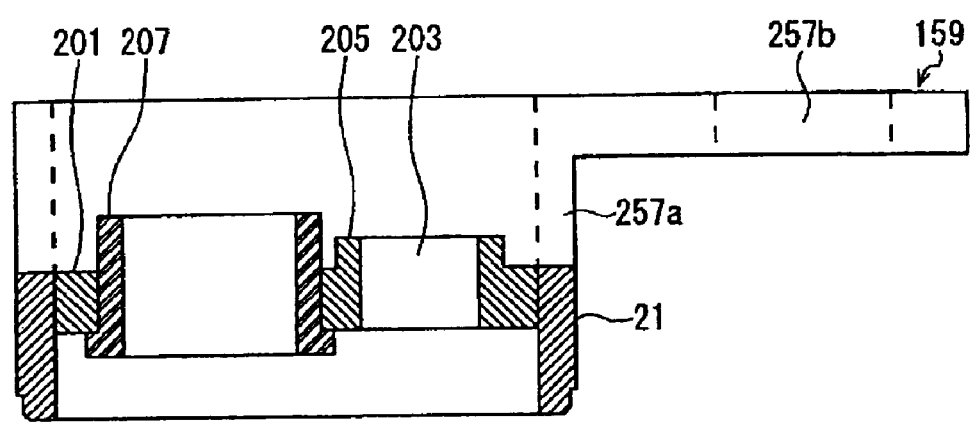

The sealing plate 41 is made from aluminum in the description given earlier, but the sealing plate may be made from a resin, such as phenol resin, polypropylene, or polyphenylene sulfide. FIGS. 8 contains a plan view and a longitudinal sectional view of another sealing plate and another busbar structure. The outer case 21 has a resin sealing plate 201 provided thereinside. The sealing plate 201 has a one-way valve fitting portion 205 formed in a tubular shape therein so as to include a hole 203 in order to mount a one-way valve in the hole. In FIG. 8, the sealing plate 201 has an aluminum tubular center terminal 207 fastened therethrough in a left area thereof.

The busbar 257 has a barrel portion 257a formed in a hollow shape so as to extend from the outer case 21. The barrel portion 257a has a projecting plate 257b extending from the top end of the barrel portion 257a horizontally to the right. The bottom end of the barrel portion 257a of the busbar 257 is welded to the outer case 21. The projecting plate 157b has a terminal hole 159 formed in an end thereof, so that the positive electrode of another unitary cell to be connected in series can be connected.

These sealing plate and busbar can be manufactured easily at low cost. The barrel portion 257a of the busbar 257 is welded to the outer case 21, and the length of the projecting plate 257b is minimized. The device is robust and has a small connection resistance. Accordingly, the device can cope with a large current.

Preferred materials used in the electric double layer capacitor having the power collection structure described above according to the present invention will now be described.

The collector foil 107A and 107B used in the electrodes 103A and 103B forming the positive electrode and negative electrode can be made from any material having an excellent resistance to electrochemical corrosion on the positive electrode side. In terms of machinability and weight reduction, foil made from aluminum, an aluminum alloy, or stainless steel is preferred.

Materials that can be preferably used in the electrode layers 9A and 9B are materials having a high-specific surface area of 100 to 3,000 $m^2/g$, based on a carbon material, such as activated carbon based on a resin including a phenol resin, coconut shell, coke, or pitch, carbon nanotubes, carbon aerogel, or polyacene. Preferred electric conducting agents include carbon black, short carbon fiber, and metal fiber. The electrode layers 9A and 9B used in the positive and negative electrodes may be formed from the same material or from different materials.

The material of the separators 5A and 5B should have ion permeability, and the material is preferably a porous material having electrical insulating properties, chemical stability in an electrolyte environment, and a high electrolyte absorption and storage. More specifically, preferable materials include fiberglass, silica fiber, alumina fiber, asbestos, whiskers thereof, and other inorganic materials; Manila paper, cellulose paper, kraft paper, mixed paper manufactured from rayon fiber and sisal hemp, and other paper materials; or synthetic polymer fiber of polyolefin, polyester, and the like, and other organic materials. A sheet manufactured from those materials, a microporous film having microporosity resulting from stretching, or the like are preferred.

The material of the collector plates 141A and 141B is preferably the same as the material of the collector foil 107A and 107B, and most suitable materials include aluminum, an aluminum alloy, and stainless steel. In view of the machinability and reduced resistance of the unitary cell 100, it is preferred that the collector plates 141A and 141B have a thickness of 0.3 mm or greater and up to 1.0 mm or less in designing.

The material of the terminals 151 and 163 is preferably the same as the material of the collector foil 107A and 107B in view of reduced resistance. Aluminum, an aluminum alloy and stainless steel would be the best materials, and copper can also be used.

INDUSTRIAL APPLICABILITY

The storage device according to the present invention has a simple structure, ease of connection of external terminals, and a low connection resistance, cope with a large current, and ensures stability after connection.

The entire disclosure of Japanese Patent Application No. 2005-135344, filed on May 6, 2005, including the specification, claims, drawings and summary, is incorporated herein by reference.

What is claimed is:

1. A storage device comprising:
    long sheets of collector foils;
    a first electrode and a second electrode, each comprising a long electrode layer formed on at least one surface of a long sheet of collector foil, leaving a strip part along a long side of the long sheet of collector foil;
    long separators placed between the first electrode and the second electrode;
    a first external terminal and a second external terminal electrically connected to the first electrode and the second electrode, respectively, for collecting a current;
    an electrolyte;
    a metal case for accommodating the first electrode, the second electrode, the separators, and the electrolyte and for functioning as the second external terminal; and
    a sealing plate including the first external terminal, for sealing the metal case;
    wherein the first electrode and the second electrode are wound, with the separators placed therebetween, to form a pillar-shaped element;
    the strip part of the first electrode and the strip part of the second electrode are disposed to protrude from opposite sides of the separators;
    the first external terminal is held on the sealing plate;
    the sealing plate or the metal case has a plate-shaped busbar welded thereto, a part of the busbar having a projecting part protruding from the sealing plate; and
    the projecting part has a terminal hole formed therein so as to have substantially the same shape as a bottom surface of the first external terminal.

2. The storage device according to claim 1, wherein the first external terminal is disposed such that 80% or greater of an area of the bottom surface of the first external terminal is located within a half of a bottom surface of the pillar-shaped element.

3. The storage device according to claim 1, wherein the area of the bottom surface of the first external terminal is 3% to 50% of an area of the bottom surface of the pillar-shaped element.

4. The storage device according to claim 1, further comprising a first collector plate disposed between the first electrode and the sealing plate, and integrated with or connected directly to the first external terminal, for electrically connecting the first electrode and the first external terminal,
    wherein the strip part of the first electrode is laser-welded to the first collector plate.

5. The storage device according to claim 1,
    wherein the strip part of the second electrode is laser-welded to a second collector plate;
    the second collector plate has a current collecting section integrally formed therein or connected directly thereto; and
    the current collecting section is electrically connected to the metal case.

* * * * *

UNITED STATES PATENT AND TRADEMARK OFFICE
CERTIFICATE OF CORRECTION

PATENT NO. : 7,474,520 B2 Page 1 of 1
APPLICATION NO. : 11/935569
DATED : January 6, 2009
INVENTOR(S) : Kashihara et al.

It is certified that error appears in the above-identified patent and that said Letters Patent is hereby corrected as shown below:

On the title page, Item (63), the Related U.S. Application Data information is incorrect. Item (63) should read:

Item

-- Related U.S. Application Data

(63) Continuation of application No. PCT/JP2006/309251, filed on May 8, 2006. --

Signed and Sealed this

Seventeenth Day of February, 2009

JOHN DOLL
*Acting Director of the United States Patent and Trademark Office*